US012654619B2

(12) United States Patent
Fowler et al.

(10) Patent No.: US 12,654,619 B2
(45) Date of Patent: Jun. 16, 2026

(54) VEHICLE SNOWPLOW ALIGNMENT SYSTEMS

(71) Applicant: GM GLOBAL TECHNOLOGY OPERATIONS LLC, Detroit, MI (US)

(72) Inventors: Bryan W. Fowler, Shelby Township, MI (US); Drew Robert Baetens, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 397 days.

(21) Appl. No.: 18/536,618

(22) Filed: Dec. 12, 2023

(65) Prior Publication Data

US 2025/0187543 A1      Jun. 12, 2025

(51) Int. Cl.
B60R 1/24          (2022.01)
E01H 5/06          (2006.01)
G06T 7/80          (2017.01)

(52) U.S. Cl.
CPC ................. B60R 1/24 (2022.01); E01H 5/06 (2013.01); G06T 7/80 (2017.01)

(58) Field of Classification Search
CPC . G06T 2207/30252; G06T 2207/10016; G06T 7/246; G06T 2207/30204; G06T 7/73; G06T 7/70; G06T 7/80; G06V 20/56; G06V 20/588; G06V 10/44; B60R 1/24; B60R 1/28; B60R 11/04; B60R 2300/8053; A01B 69/008; E01H 5/06
See application file for complete search history.

(56) References Cited

U.S. PATENT DOCUMENTS

| | | | | |
|---|---|---|---|---|
| 10,351,061 | B1 * | 7/2019 | Chaudhari .............. | B60R 1/003 |
| 11,787,336 | B2 * | 10/2023 | Raeis Hosseiny ........ | B60R 1/26 |
| | | | | 348/148 |
| 2005/0193603 | A1 | 9/2005 | Schultz et al. | |
| 2009/0040300 | A1 * | 2/2009 | Scribner ................ | H04N 7/185 |
| | | | | 348/148 |

OTHER PUBLICATIONS

Office Action dated May 27, 2024 from German Patent Office for German Patent No. 102024102359.7; 4pgs.

* cited by examiner

*Primary Examiner* — Courtney Joan Nelson

(57)          ABSTRACT

A vehicle snowplow guidance system includes a vehicle camera mounted on a vehicle and configured to capture images from a front of the vehicle, a vehicle user interface configured to display images, a snowplow including two headlamp assemblies spaced apart from one another, and a vehicle control module in communication with the vehicle camera. The vehicle control module is configured to detect locations of each of the two headlamp assemblies of the snowplow, determine a centerline between the two headlamp assemblies according to the detected locations, and display the snowplow and the determined centerline on the vehicle user interface to facilitate alignment of the vehicle with a center of the snowplow for connection of the snowplow to the vehicle.

20 Claims, 4 Drawing Sheets

VEHICLE SNOWPLOW ALIGNMENT SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle snowplow alignment systems, including detection of a centerline of snowplow headlamp assemblies and corresponding vehicle steering control.

Vehicles are often coupled with snowplows in order to clear roads, parking lots, driveways and other driving surfaces of snow, to make driving easier for other vehicles. The snowplows are typically connected to vehicles by mounting one or more snowplow couplers to a snowplow push beam of the vehicle. Snowplows are usually heavy and difficult to move on the ground, so alignment of the vehicle snowplow push beam with the snowplow coupler(s) is important to facilitate ease of coupling the snowplow to the vehicle.

SUMMARY

A vehicle snowplow guidance system includes a vehicle camera mounted on a vehicle and configured to capture images from a front of the vehicle, a vehicle user interface configured to display images, a snowplow including two headlamp assemblies spaced apart from one another, and a vehicle control module in communication with the vehicle camera, the vehicle control module configured to detect locations of each of the two headlamp assemblies of the snowplow, determine a centerline between the two headlamp assemblies according to the detected locations, and display the snowplow and the determined centerline on the vehicle user interface to facilitate alignment of the vehicle with a center of the snowplow for connection of the snowplow to the vehicle.

In other features, the vehicle control module is configured to determine the centerline by identifying a center of each of the two headlamp assemblies, and calculating the centerline according to the identified center of each of the two headlamp assemblies.

In other features, the vehicle control module is configured to identify a forward direction of the vehicle, calculate a difference between the forward direction of the vehicle and the determined centerline between the two headlamp assemblies, and display a steering path on the vehicle user interface indicative of a steering direction to align the forward direction of the vehicle with the determined centerline between the two headlamp assemblies.

In other features, the vehicle control module is configured to obtain a steering wheel angle of the vehicle, and identify the forward direction of the vehicle according to the steering wheel angle.

In other features, the vehicle control module is configured to obtain a gear position and a brake sensor value of the vehicle, and display the steering path according to the steering wheel angle, gear position and brake sensor value.

In other features, the vehicle control module is configured to display a snowplow assist mode option on the vehicle user interface, receive a user input selection of the snowplow assist mode option via the vehicle user interface, and display the snowplow and the determined centerline on the vehicle user interface in response to receiving the user input selection of the snowplow assist mode option.

In other features, the vehicle control module is configured to determine a distance between the snowplow and the vehicle, compare the determined distance to a display distance threshold, and display the snowplow and the determined centerline on the vehicle user interface in response to the determined distance being less than the display distance threshold.

In other features, the vehicle control module is configured to control automated steering of the vehicle to align the vehicle with the determined centerline between the two headlamp assemblies.

In other features, the vehicle control module is configured to control automated acceleration and braking of the vehicle to align the vehicle with the determined centerline between the two headlamp assemblies.

In other features, the vehicle includes a snowplow push beam configured to mount the snowplow and push the snowplow according to movement of the vehicle, the snowplow includes one or more snowplow couplers configured to couple the snowplow to the snowplow push beam of the vehicle, and the determined centerline between the two headlamp assemblies corresponds to a center of the one or more snowplow couplers.

A method for aligning connection of a snowplow to a vehicle includes capturing, via a vehicle camera mounted on a vehicle, an image of a snowplow in front of a vehicle, the snowplow including two headlamp assemblies spaced apart from one another, detecting locations of each of the two headlamp assemblies of the snowplow, determining a centerline between the two headlamp assemblies according to the detected locations, and displaying the snowplow and the determined centerline on a vehicle user interface of the vehicle, to facilitate alignment of the vehicle with a center of the snowplow for connection of the snowplow to the vehicle.

In other features, determining the centerline includes identifying a center of each of the two headlamp assemblies, and calculating the centerline according to the identified center of each of the two headlamp assemblies.

In other features, the method includes identifying a forward direction of the vehicle, calculating a difference between the forward direction of the vehicle and the determined centerline between the two headlamp assemblies, and displaying a steering path on the vehicle user interface indicative of a steering direction to align the forward direction of the vehicle with the determined centerline between the two headlamp assemblies.

In other features, the method includes obtaining a steering wheel angle of the vehicle, and identifying the forward direction of the vehicle according to the steering wheel angle.

In other features, the method includes obtaining a gear position and a brake sensor value of the vehicle, and displaying the steering path according to the steering wheel angle, gear position and brake sensor value.

In other features, the method includes displaying a snowplow assist mode option on the vehicle user interface, receiving a user input selection of the snowplow assist mode option via the vehicle user interface, and displaying the snowplow and the determined centerline on the vehicle user interface in response to receiving the user input selection of the snowplow assist mode option.

In other features, the method includes determining a distance between the snowplow and the vehicle, comparing the determined distance to a display distance threshold, and displaying the snowplow and the determined centerline on the vehicle user interface in response to the determined distance being less than the display distance threshold.

In other features, the method includes controlling automated steering of the vehicle to align the vehicle with the determined centerline between the two headlamp assemblies.

In other features, the method includes controlling automated acceleration and braking of the vehicle to align the vehicle with the determined centerline between the two headlamp assemblies.

In other features, the vehicle includes a snowplow push beam configured to mount the snowplow and push the snowplow according to movement of the vehicle, the snowplow includes one or more snowplow couplers configured to couple the snowplow to the snowplow push beam of the vehicle, and the determined centerline between the two headlamp assemblies corresponds to a center of the one or more snowplow couplers.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
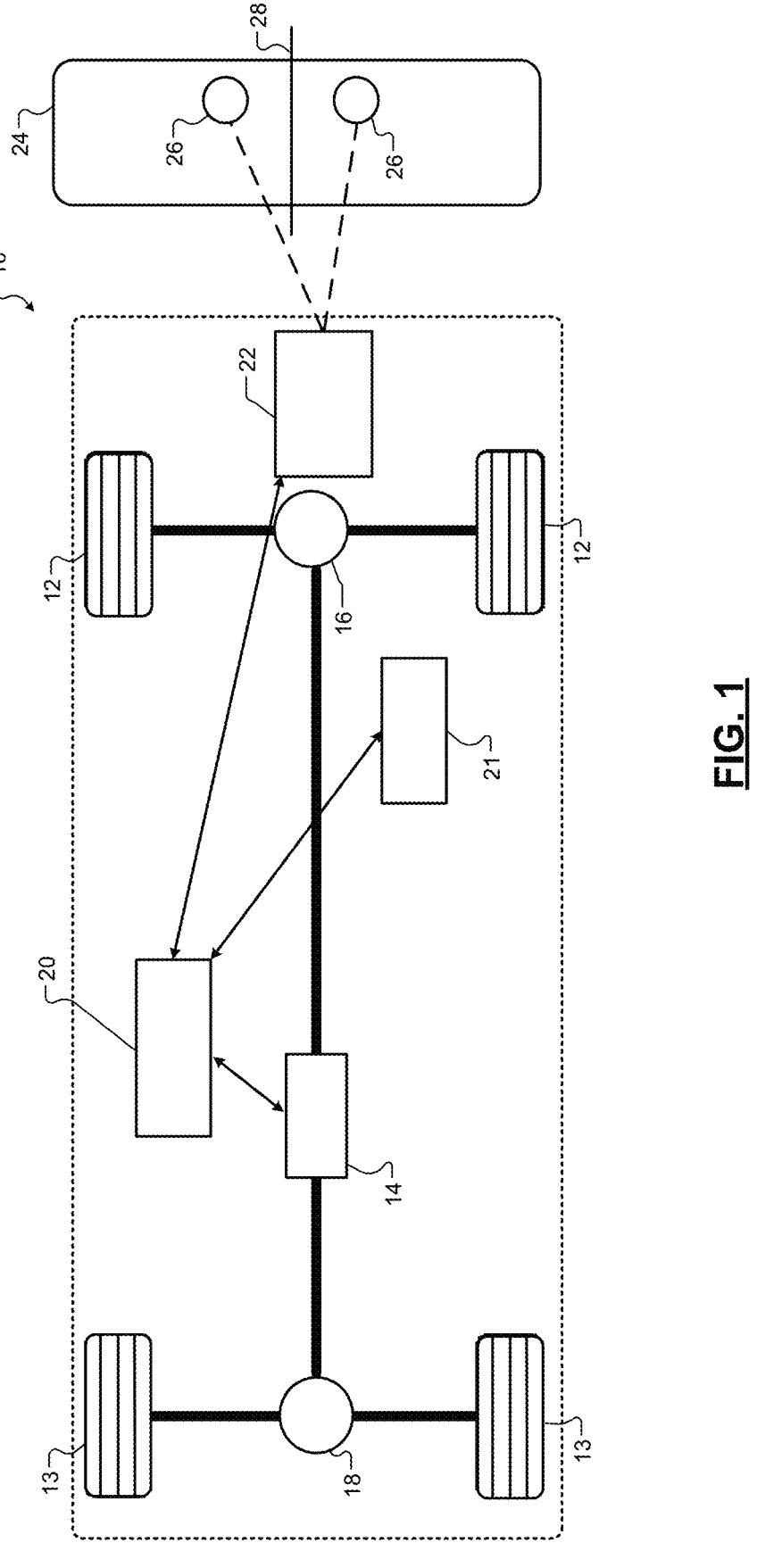
FIG. 1 is a diagram of an example vehicle including a vehicle control module configured to detect alignment of a snowplow.

Some example embodiments described herein implement a method to detect a snowplow coupler (e.g., a snowplow tower, a snowplow mounting bracket, etc.), and provide guidelines to allow the driver to closely align the snowplow for attachment. A mounted vehicle push beam may be used with a front camera module, where the front camera module may be mounted to a centerline of vehicle. Detection of a center of the snowplow couplers (e.g., snowplow brackets) may be implemented with target indicators, such as characterization of snowplow headlamp assemblies. Example methods may help reduce driver frustration, and increase efficiencies in snowplow mounting time.

In some examples, detection and learning of snowplow mechanisms are used with a visual alignment aid, to help reduce or prevent damage due to misalignment while attempting to couple the snowplow to the plow vehicle. Vehicle camera detection using visual indicators on the snowplow, or remembering physical snowplow lighting assemblies, facilitates calculation of a center of the snowplow, to provide a snowplow mounting guideline in front of the vehicle on a vehicle display.

A vehicle control module may use a driver input screen, a front camera module, an interior view display, steering information, vehicle gear position, and optional self-driving technologies that provide automated acceleration, steering and breaking. In some examples, a driver may select a snowplow support mode from a user interface (UI) inside of the vehicle, and may select a secondary option for assistance in attaching the snowplow to the plow vehicle.

With the snowplow detached and in front of the vehicle, a driver may move the vehicle in proximity of the snowplow in a similar manner to a manual snowplow connection process. The front camera module (or other vehicle camera or image sensor) then identify lighting assemblies (e.g., low-high beam combination assemblies) on the snowplow, and the vehicle control module may prompt for verification from the driver that the detected assemblies are headlamp assemblies (or other components that are equally placed from the centerline of plow).

The vehicle control module is configured to compute a center point between the snowplow lighting assemblies, and establish a virtual target on the interior display of the vehicle. Guideline algorithms may be used to determine a guideline based on the calculated center point, and display a guideline on the interior vehicle display which provides a steering path to align a center of vehicle with the centerline of the snowplow.

Informational text may complement vehicle forward movement, to assist the driver in approaching the snowplow. In a manual drive scenario, the driver moves the vehicle forward until proper contact with the plow was made. In an optional automated drive scenario, the driver may select automated assist from a UI submenu. The driver may be prompted to apply brakes as the vehicle moves (e.g., with optional hands off steering wheel), to complete contact between the vehicle side push bar and snowplow couplers. The driver has the ability for manual braking (e.g., a failsafe is designed in to prevent continued forward movement beyond what is needed or desired). Vehicle characteristics may be monitored to realize resistance of the vehicle pushing the uncoupled plow, until both snowplow couplers are in contact.

The driver then proceeds to place the vehicle in park (e.g., in a manual assist mode) or the vehicle shifts to park automatically (e.g., in an automated assist mode), and the driver exits the vehicle to complete a snowplow coupling procedure per snowplow manufacturer instructions. Some example embodiments may resolve inconvenience associated with an individual connecting a snowplow to the push bar of the vehicle, due to a lack of visibility and dimensional perspective. The system aids the driver in alignment so that multiple entry and exits are not needed to assure snowplow alignment for hook-up, which reduces the likelihood of damage due to a grossly misaligned vehicle push beam and snowplow coupler.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration pedal, a brake pedal, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, steering wheel position sensors, braking sensors, location sensors such as global positioning system (GPS) antennas, etc.). Some sensors may be configured to monitor current motion of the vehicle, acceleration of the vehicle, braking of the vehicle, current steering direction of the vehicle, etc.

As shown in FIG. 1, the vehicle 10 includes a front vehicle camera 22, and may include optional side and rear cameras. In various implementations, the vehicle 10 may include more or less (or none) of any one of these vehicle cameras. Each vehicle camera may include any suitable camera lens and image capture components, may optionally be associated with a laser, lidar sensor, etc.

The front vehicle camera 22 may be used to detect objects around the vehicle 10, such as a snowplow 24 in front of the vehicle. In some example embodiments, vehicle camera(s) may be configured to detect a closest in-path vehicle (CIPV) (e.g., another vehicle in front of a current driving path of the vehicle 10), a vulnerable road user (VRU) (e.g., a pedestrian or cyclist), may be implemented as backup cameras for controlling automated braking or audible alerts while the vehicle is traveling in reverse, etc. Data obtained from the vehicle cameras may be used to control automated vehicle motion control features, such as automated acceleration and braking based on sensed objects or vehicles around the vehicle 10, such as the snowplow 24.

The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2V) communinication, the vehicle 10 may include one or more V2X transceivers (e.g., V2X signal transmission and/or reception antennas).

The vehicle 10 also includes a user interface 21. The user interface 21 may include any suitable displays (such as on a dashboard, a console, or elsewhere), a touchscreen or other input devices, speakers for generation of audio, etc. In some example embodiments, the vehicle control module 20 may be configured to provide a visual indication of a centerline 28 of the snowplow 24 (such as a centerline 28 defined between two headlamp assemblies 26 of the snowplow 24), to facilitate alignment of the vehicle 10 with the center of the snowplow 24 in order to couple the snowplow 24 to the vehicle For example, the snowplow 24 may include two headlamp assemblies 26, which may be required by law, local ordinances, etc., and may have standard dimensions as specified by various snowplow manufacturers, etc. As explained further below, the vehicle control module 20 may be configured to detect the headlamp assemblies 26 (which may include identifying a center of the headlamp assemblies 26) based on an image of the snowplow 24 captured via the front vehicle camera 22.

The vehicle control module 20 may detect the headlamp assemblies 26 using any suitable image processing algorithms, which may be based on trained image detection models, stored data regarding known snowplow manufacturing arrangements of headlamp assemblies, etc. The vehicle control module then calculates a centerline 28 between the headlamp assemblies 26, which may correspond to a center of the snowplow 24 and a center of snowplow couplers (e.g., mounting brackets for coupling the snowplow 24 to a push bar of the vehicle 10).

The centerline 28 is then displayed on the user interface 21 of the vehicle 10, to let a driver know whether the vehicle 10 is currently aligned with the center of the snowplow 24. In some examples, the vehicle control module 20 may calculate a steering path to align the vehicle 10 with the centerline 28, and may display the steering path on the user interface 21 to guide the driver.

Figure 2:
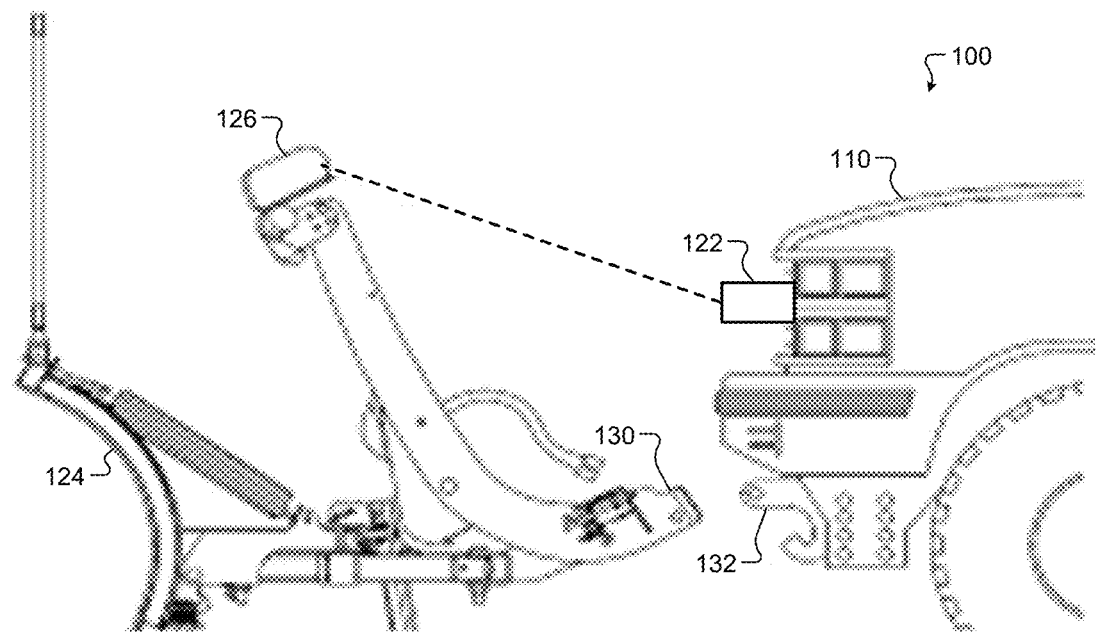
FIG. 2 is a side view of a vehicle camera module configured to detect locations of headlamp assemblies of a snowplow.

FIG. 2 is a side view of a snowplow alignment system 100, including a vehicle camera module 122 configured to detect locations of headlamp assemblies 126 of a snowplow 124. As shown in FIG. 2, the vehicle camera module 122 is mounted to a front center location on the vehicle 110.

The vehicle camera module 122 is configured to capture an image of the snowplow 124 including the headlamp assemblies 126, and a vehicle control module (which may include or be separate from the vehicle camera module 122) is configured to determine a centerline of the snowplow 124 based on locations of the headlamp assemblies 126 in the image captured by the vehicle camera module 122.

The vehicle control module then displays the centerline on a user interface of the vehicle 110. The centerline may correspond to a center of snowplow couplers 130. For example, the snowplow 124 includes one or more snowplow couplers 130 (e.g., mounting brackets) for coupling the snowplow 124 to a push bar 132 of the vehicle 110. The snowplow centerline displayed on the vehicle user interface allows the driver to align a center of the push bar 132 of the vehicle 110 with a center of the snowplow couplers 130, to facilitate proper coupling of the snowplow 124 to the push bar 132.

Figure 3:
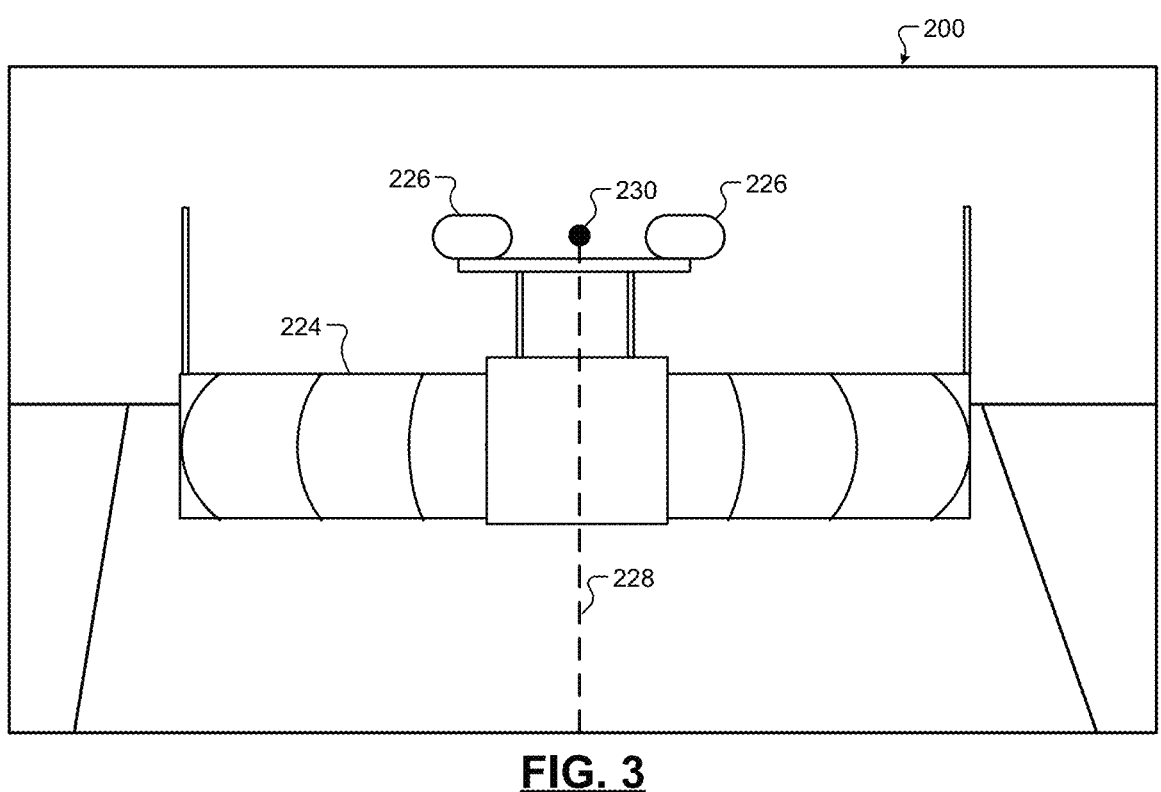
FIG. 3 is an illustration of an example user interface depicting a centerline of snowplow headlamp assemblies.

FIG. 3 is an illustration of an example of a user interface 200 depicting a centerline 228 of headlamp assemblies 226. For example, the user interface 200 may depict an image captured by the front vehicle camera 22 of FIG. 1, after processing by the vehicle control module 20 to determine and display a centerline for the snowplow.

As shown in FIG. 3, the snowplow 224 includes two headlamp assemblies 226. The vehicle control module is configured to detect the headlamp assemblies 226 using any suitable object detection algorithms, which may include trained image detection models, image detection associated with stored headlamp assembly arrangement data for known snowplow manufacturers, etc.

The vehicle control module is configured to determine a center point 230 between the headlamp assemblies 226, which may include identifying a center of each headlamp assembly 226. The center point 230 may be calculated by finding a midpoint along a distance between the two headlamp assemblies 226, or a distance between centers of the headlamp assemblies 226.

The vehicle control module then determines a centerline 228 based on the calculated center point 230 between the headlamp assemblies, which may correspond to a center of the snowplow 224. The centerline 228 is displayed on the user interface 200, to assist a driver in aligning a vehicle with the center of the snowplow 224. In some examples, a steering path may be calculated and displayed on the user interface 200 to show a driver which direction the vehicle should be turned to align with the centerline 228 of the snowplow 224.

Figure 4:
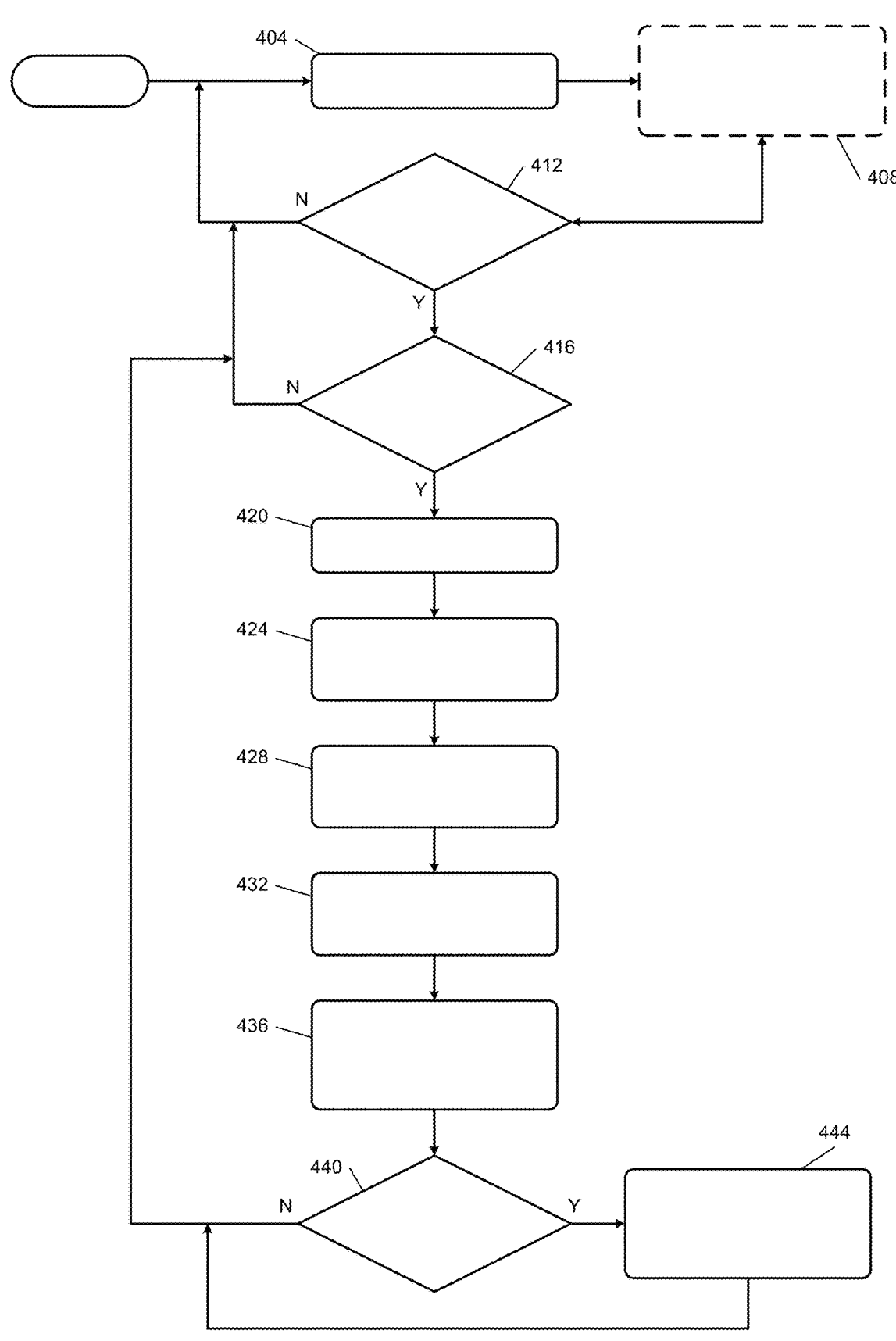
FIG. 4 is a flowchart depicting an example process for controlling alignment of a vehicle with a centerline of a snowplow.

FIG. 4 is a flowchart depicting an example process for controlling alignment of a vehicle with a centerline of a snowplow. The process may be performed by, for example, the vehicle control module 20 of FIG. 1. At 404, the process begins by obtaining an image from the front vehicle camera, such as the front vehicle camera 22 of FIG. 1.

The vehicle control module is optionally configured to obtain additional vehicle parameters at 408, such as a steering wheel angle of the vehicle, a gear position of the vehicle (e.g., drive, neutral, reverse), a brake sensor value (e.g., indicative of whether the brakes are applied and at what braking pressure), etc.

At 412, the vehicle control module is configured to determine whether a "snowplow assist" mode of the vehicle is active. For example, as explained further below with reference to FIG. 5, in some examples a user interface may display various optional modes to a driver, allowing the driver to select a snowplow assistance mode when the driver desires to connect a snowplow to the vehicle.

If the snowplow assistance mode is not set at 412, control returns to 404 to continue obtaining updated images of the front of the vehicle (which may include a snowplow when a snowplow is positioned in front of the vehicle). If the snowplow assistance mode is active at 412, control proceeds to 416 to determine whether the snowplow is within a distance threshold.

For example, the snowplow assistance mode may be configured to identify a centerline of a snowplow only if the snowplow is within ten yards of the vehicle, within twenty feet of the vehicle, within ten feet of the vehicle, within five feet of the vehicle, etc. The vehicle control module may be configured to determine a distance between the snowplow and the vehicle using any suitable process (such as image processing of an image captured by the front vehicle camera 22, use of a laser or lidar to determine a distance, etc.).

The vehicle control module then compares the determined distance to a distance threshold, and if the snowplow is not within the distance threshold, control returns to 404 to continue obtaining updated images of the snowplow via the front vehicle camera. The vehicle control module may be configured to display an error message on the user interface that the snowplow is too far away and the vehicle should be brought closer to the snowplow in order to implement the snowplow centerline detection process.

Once the snowplow is within the specified distance threshold at 416, control proceeds to 420 to display the snowplow on the user interface (although the snowplow may optionally be displayed prior to 420 when the user interface is configured to continuously display images captured by the front vehicle camera).

At 424, the vehicle control module is configured to identify snowplow headlamp assemblies, which may include identifying centers of the headlamp assemblies. The headlamp assembly and center detection may be performed using any suitable image processing and object detection implementations.

At 428, the vehicle control module is configured to calculate a centerline between the headlamp assemblies, such as by determining a midpoint of a distance between centers of the detected locations of the headlamp assemblies. Control then displays the centerline relative to the snowplow on the user interface at 432.

For example, the determined centerline may correspond to a center of snowplow couplers, used to couple the snowplow to the vehicle. At 436, the vehicle control module is configured to determine a steering path from a current vehicle position to the centerline.

In various examples, the vehicle control module may obtain a current steering wheel angle of the vehicle and compare a forward direction of the vehicle to the centerline in order to determine a desired steering path to align the forward direction of the vehicle with the centerline. The desired steering path is then displayed on the user interface to assist a driver in aligning the vehicle with the center of the snowplow.

At 440, control determines whether the vehicle includes an automated driving system, and if so, whether auto-steer has been enabled for automatic snowplow assistance (e.g., via a user input selection of an automatic snowplow assistance mode via the user interface). If automated assistance has been selected, control proceeds to 444 to automatically control movement of the vehicle towards the snowplow centerline.

For example, the vehicle control module may automatically turn the vehicle steering wheel in a direction to align forward movement of the vehicle towards the centerline of the snowplow. The vehicle control module may optionally control automated acceleration and braking of the vehicle to move the vehicle towards the snowplow. A brake override feature may be implemented to allow a user to apply brakes to avoid potential damage due to contact between the vehicle and the snowplow.

Figure 5:
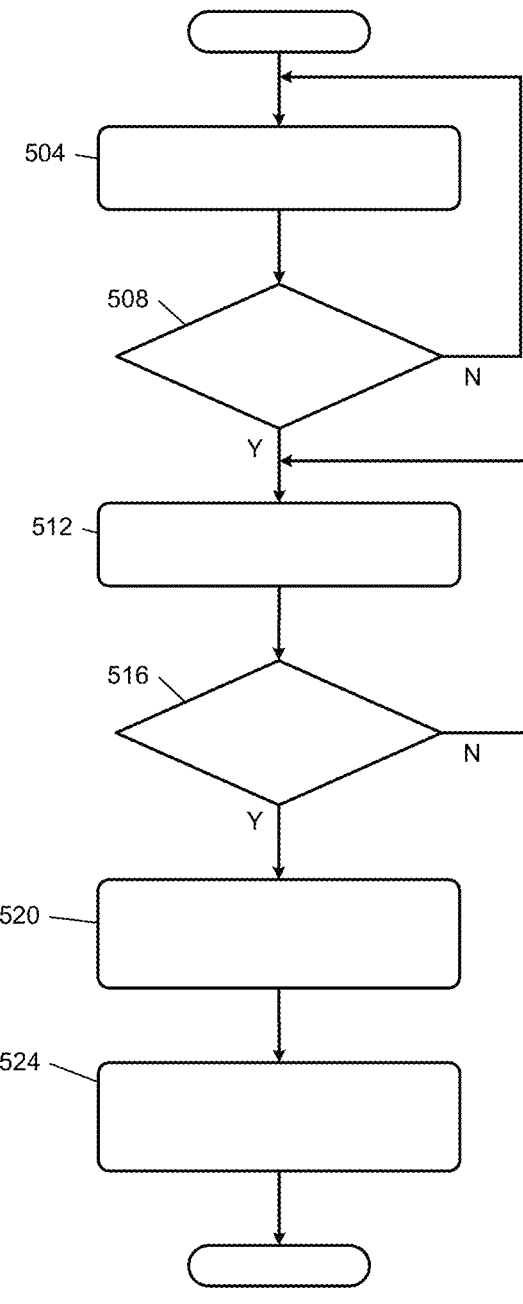
FIG. 5 is a flowchart depicting an example process for displaying snowplow assistance features on a vehicle user interface.

FIG. 5 is a flowchart depicting an example process for displaying snowplow assistance features on a vehicle user interface. The process may be performed by, for example, the vehicle control module 20 of FIG. 1. At 504, the process begins by displaying feature management options on a user interface of the vehicle.

At 508, the vehicle control module is configured to determine whether a snowplow support option has been selected by a driver. If so, control displays snow plow support options on the user interface at 512. At 516, control determines whether a snowplow assist mode has been selected.

If so, control proceeds to 520 to receive user input indicating a selection of a manual snowplow assist mode or an automated snowplow assist mode. Control then assigns the snowplow centerline settings according to the selection input received from the user.

For example, in a manual assist mode the vehicle control module may be configured to display a centerline of the snowplow and a steering path for vehicle and snowplow alignment. In an automated assist mode, the vehicle control module may control automated steering, acceleration and/or braking of the vehicle to move the vehicle toward the determined centerline of the snowplow using automated driving systems of the vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle snowplow guidance system comprising:
   a vehicle camera mounted on a vehicle and configured to capture images from a front of the vehicle;
   a vehicle user interface configured to display images;
   a snowplow including two headlamp assemblies spaced apart from one another; and
   a vehicle control module in communication with the vehicle camera, the vehicle control module configured to:
      detect locations of each of the two headlamp assemblies of the snowplow;
      determine a centerline between the two headlamp assemblies according to the detected locations; and
      display the snowplow and the determined centerline on the vehicle user interface to facilitate alignment of the vehicle with a center of the snowplow for connection of the snowplow to the vehicle.

2. The vehicle snowplow guidance system of claim 1, wherein the vehicle control module is configured to determine the centerline by:
   identifying a center of each of the two headlamp assemblies; and
   calculating the centerline according to the identified center of each of the two headlamp assemblies.

3. The vehicle snowplow guidance system of claim 1, wherein the vehicle control module is configured to:
   identify a forward direction of the vehicle;
   calculate a difference between the forward direction of the vehicle and the determined centerline between the two headlamp assemblies; and
   display a steering path on the vehicle user interface indicative of a steering direction to align the forward direction of the vehicle with the determined centerline between the two headlamp assemblies.

4. The vehicle snowplow guidance system of claim 3, wherein the vehicle control module is configured to:
   obtain a steering wheel angle of the vehicle; and
   identify the forward direction of the vehicle according to the steering wheel angle.

5. The vehicle snowplow guidance system of claim 4, wherein the vehicle control module is configured to:
   obtain a gear position and a brake sensor value of the vehicle; and
   display the steering path according to the steering wheel angle, gear position and brake sensor value.

6. The vehicle snowplow guidance system of claim 1, wherein the vehicle control module is configured to:

display a snowplow assist mode option on the vehicle user interface;
receive a user input selection of the snowplow assist mode option via the vehicle user interface; and
display the snowplow and the determined centerline on the vehicle user interface in response to receiving the user input selection of the snowplow assist mode option.

7. The vehicle snowplow guidance system of claim 6, wherein the vehicle control module is configured to:
   determine a distance between the snowplow and the vehicle;
   compare the determined distance to a display distance threshold; and
   display the snowplow and the determined centerline on the vehicle user interface in response to the determined distance being less than the display distance threshold.

8. The vehicle snowplow guidance system of claim 1, wherein the vehicle control module is configured to control automated steering of the vehicle to align the vehicle with the determined centerline between the two headlamp assemblies.

9. The vehicle snowplow guidance system of claim 8, wherein the vehicle control module is configured to control automated acceleration and braking of the vehicle to align the vehicle with the determined centerline between the two headlamp assemblies.

10. The vehicle snowplow guidance system of claim 1, wherein:
   the vehicle includes a snowplow push beam configured to mount the snowplow and push the snowplow according to movement of the vehicle;
   the snowplow includes one or more snowplow couplers configured to couple the snowplow to the snowplow push beam of the vehicle; and
   the determined centerline between the two headlamp assemblies corresponds to a center of the one or more snowplow couplers.

11. A method for aligning connection of a snowplow to a vehicle, the method comprising:
   capturing, via a vehicle camera mounted on a vehicle, an image of a snowplow in front of a vehicle, the snowplow including two headlamp assemblies spaced apart from one another;
   detecting locations of each of the two headlamp assemblies of the snowplow;
   determining a centerline between the two headlamp assemblies according to the detected locations; and
   displaying the snowplow and the determined centerline on a vehicle user interface of the vehicle, to facilitate alignment of the vehicle with a center of the snowplow for connection of the snowplow to the vehicle.

12. The method of claim 11, wherein determining the centerline includes:
   identifying a center of each of the two headlamp assemblies; and
   calculating the centerline according to the identified center of each of the two headlamp assemblies.

13. The method of claim 11, further comprising:
   identifying a forward direction of the vehicle;
   calculating a difference between the forward direction of the vehicle and the determined centerline between the two headlamp assemblies; and
   displaying a steering path on the vehicle user interface indicative of a steering direction to align the forward direction of the vehicle with the determined centerline between the two headlamp assemblies.

13

14

14. The method of claim 13, further comprising:

obtaining a steering wheel angle of the vehicle; and identifying the forward direction of the vehicle according to the steering wheel angle.

15. The method of claim 14, further comprising:

obtaining a gear position and a brake sensor value of the vehicle; and displaying the steering path according to the steering wheel angle, gear position and brake sensor value.

16. The method of claim 11, further comprising:

displaying a snowplow assist mode option on the vehicle user interface;

receiving a user input selection of the snowplow assist mode option via the vehicle user interface; and displaying the snowplow and the determined centerline on the vehicle user interface in response to receiving the user input selection of the snowplow assist mode option.

17. The method of claim 16, further comprising:

determining a distance between the snowplow and the vehicle;

comparing the determined distance to a display distance threshold; and displaying the snowplow and the determined centerline on the vehicle user interface in response to the determined distance being less than the display distance threshold.

18. The method of claim 11, further comprising controlling automated steering of the vehicle to align the vehicle with the determined centerline between the two headlamp assemblies.

19. The method of claim 18, further comprising controlling automated acceleration and braking of the vehicle to align the vehicle with the determined centerline between the two headlamp assemblies.

20. The method of claim 11, wherein:

the vehicle includes a snowplow push beam configured to mount the snowplow and push the snowplow according to movement of the vehicle;

the snowplow includes one or more snowplow couplers configured to couple the snowplow to the snowplow push beam of the vehicle; and the determined centerline between the two headlamp assemblies corresponds to a center of the one or more snowplow couplers.

* * * * *